(12) United States Patent
Haas

(10) Patent No.: US 6,513,710 B1
(45) Date of Patent: Feb. 4, 2003

(54) TRADE SHOW ATTENDEE CONTROL, LEAD COLLECTION AND EVENT CONTROL SYSTEM

(75) Inventor: David J. Haas, Suffern, NY (US)

(73) Assignee: Temtec, Inc., Suffern, NY (US)

( * ) Notice: Subject to any disclaimer, the term of this patent is extended or adjusted under 35 U.S.C. 154(b) by 82 days.

(21) Appl. No.: 09/580,952

(22) Filed: May 30, 2000

Related U.S. Application Data

(60) Provisional application No. 60/135,129, filed on May 20, 1999.

(51) Int. Cl.[7] .................................................. B06K 5/00
(52) U.S. Cl. ........................................ 235/380; 235/382
(58) Field of Search ............... 235/375, 462.01–462.49, 235/472.01, 494, 486, 493, 492, 449, 454, 380, 382, 384, 383

(56) References Cited

U.S. PATENT DOCUMENTS

| | | | | |
|---|---|---|---|---|
| 5,003,349 A | * | 3/1991 | Welp et al. ................ | 355/100 |
| 5,706,517 A | * | 1/1998 | Dickinson ................... | 395/683 |
| 5,732,229 A | * | 3/1998 | Dickinson ................... | 395/334 |
| 5,920,053 A | * | 7/1999 | De-Brouse ................. | 235/375 |

* cited by examiner

Primary Examiner—Thien M. Le
(74) Attorney, Agent, or Firm—Michael E. Zall

(57) ABSTRACT

A name card identification system for a person attending a meeting with other persons. The system comprises a name card having visual information and electronically readable code uniquely associated with the person attending the meeting. A printer is provided for printing name cards as well as a reader for reading the code on the name card. A means is provided for transmitting such code from the reader to the printer, wherein when the name card is read by the reader and the code transmitted to the printer, at least one name card is printed for such person for distribution to at least one other person attending such meeting. Preferably a plurality of cards are printed.

8 Claims, 8 Drawing Sheets

FIG. 5B

WHAT HE WANTS _____
PRICE LIMITS _____
PRODUCT NEEDS _____

PRODUCT INTEREST _____
BUDGET _____
DECISION MAKER _____
NOTES: _____

TRADE SHOW ATTENDEE CONTROL, LEAD COLLECTION AND EVENT CONTROL SYSTEM

RELATED APPLICATIONS

This application is related to Provisional Application No. 60/135,129 filed on May 20, 1999 with the same title.

BACKGROUND OF THE INVENTION

1. Field of the Invention

This invention relates to a system for keeping track of and controlling attendees at a show, e.g., trade shows and conventions, monitoring their attendance at booths and generally keeping track of and monitoring their attendance at the show.

2. Prior Art

In the past five years, computer technology and standardization in computer software have become so widespread that many association and trade show managers who sponsor and operate trade shows have begun performing many tasks previously performed by commercial Convention Registration Companies. The advent of inexpensive fast PC's, Microsoft Windows, the Internet, and laptop computers now permit a paradigm shift in the manner in which trade shows are advertised, attendees are registered, exhibitors participate in the show and how attendee/exhibitor sales lead data are collected.

In particular, advanced registration of attendees is now being performed by mail, fax, telephone and over the internet. This means that a substantial number of the attendees have registered, paid their money, and received their badges long before they actually arrive at the trades how or meeting. This eliminates a major problem and annoyance that trade show attendees have had of waiting in long lines(sometimes for hours) upon arriving at the trade show to go through the registration process. This means that the tasks of registering attendees, printing badges, and associated tasks that typically occur in the lobby of the location of the show, are reduced substantially. Prior to the paradigm shift, registration required a great number of large, bulky pieces of equipment to accommodate the typical first-day surge of attendees. Registration is now being performed with laptop PC's and simple electronic printers. This paradigm shift in the small to medium size trade shows results in the registration process, badge and ticket printing, and lead collection being performed with only laser and thermal printed documents.

There are numerous type trade shows. Such shows are differentiated by the size of the show, whether the size is determined by the number of exhibitors, the number of attendees, or the square footage of the exhibit area. Additionally such shows may only be consumer shows or other public access trade shows wherein there is no need to identify the attendee. In these type shows, no name badges are issued to attendees, and any purchases are usually made at the exhibitor's booth while the attendee is present. Additionally, there are many high profile trade shows that demand extra security and thus require the issuance of badges at the registration desk in order to see photo ID's, other proof of identification, or to view other specific requirements. In these highly attended type shows name badges are required to be issued at the front door and are highly coveted by the attendees. At other smaller type meetings and events where there are no exhibitors, name badges may be simple paper labels, and in particular where there are no exhibitors, no lead collection system is needed. Thus, name badges may be filled in by the attendee. Optionally, no name badges may be used.

Generally, the purpose of name badges for attendees of trade shows may be manifold:

1) Visual name identification of the individual by other attendees and by exhibitor salespeople. Large type is required so that the name is legible from a distance of 3–5 feet. Hence, dictates a badge size of 3" to 4";
2) Coding, for example by business type, for admission and exhibitor identification,
3) Authorization to specific areas and for specific benefits such as food, etc.;
4) A "Coding-Means", e.g., bar code, magnetic stripe, words, optically readable characters, that includes the address and other relevant data of the attendee so that it may be transmitted to exhibitors.

Trade shows have increased in size and number over the past fifty years because they are a better sales vehicles for businesses. Whereas 20–30 years ago trade shows were used only for major industry events and technical communication (transmission)events, today trade shows represent a substantial part of most marketing promotion budgets for small and large businesses. In fact, there are more than 20,000 trade shows each year in the United States that draw anywhere between 100 and 200 million attendees.

A primary reason why trade shows have continued to grow and perform so well is that the cost of a sales lead and/or the cost of a sales presentation to an attendee (sales prospect) continues to fall relative to a sales call by a salesman. The trade shows draw attendees to the shows and concentrate them in one place providing inexpensive contact by a sales person with the sales prospect. This is in contrast to sales people and other sales vehicles traveling to individual sales prospect throughout the country or specific locale. In fact, the trade show associations have their own organization (The Trade show Marketing Association) whose primary purpose is to demonstrate to marketing and sales managers how their marketing/sales expenditures will be more effectively used at a trade show, that their cost per sale will be less, and generally to try to convince them to use trade shows as a bigger part of their marketing/sales mix. In essence, trade shows are a communication media, similar to radio, television, space advertising, direct mail, bill boards, etc.

An important fact should also be recognized is that attendees of trade shows (sales prospects) would not go to trade shows, and intentionally expose themselves to advances by hundreds of salespeople if they did not also benefit from such shows, i.e., trade show attendees go to trade shows to learn, review products, solve problems, and make purchasing decisions. They subject themselves to two or three days of exhaustive work (and sometimes abuse by salespeople) in order to benefit themselves. Thus, anything that will make the attendee's work easier will make more attendees go to trade shows. In reality, trade shows are a win-win marketing devices (business tool) to permit sellers and buyers to get together.

Traditionally, trade shows operate in the following manner. A show sponsor(owner) decides to have a show and pays money to organize, advertise, and produce the show. For the site selected (the particular city and exhibit facility), a show management company is hired to obtain all the local providers of exhibit products, e.g., rugs, pipes, drapes, electrical contractors, buses, signs, registration people, etc. Attendee registration can be in advance and/or only at the time the show opens. On the date specified, the exhibit hall is assigned to the show managers for their particular show, the show is decorated, show equipment is set up, and the exhibitors move in and prepare for the attendees to arrive on the opening date of the show. When the attendees arrive, either with their badge or to pickup their badge in the lobby at the registration desk, the attendees proceed to attend speeches, seminars, and walk through the exhibit halls during the days the show is operating. At the end of the show, the decorations are all removed, the exhibitors leave with all their wears, and the show provider of food, booths, etc. remove everything from the exhibit hall, so that it is now empty, clean, and ready for the next show.

The show sponsor and show management vary depending on the show's ownership. For example, an association may sponsor a show (pay for it), hire an independent show management company to run it, and the hired show manager organizes and coordinates the entire event. Alternatively, an association may sponsor a show and perform all the show management duties themselves. On the other hand, show management companies own particular shows which they pay to produce, they manage the show themselves, and receive all the profits from the show operation (which can be millions of dollars for large shows).

The major source of income from most shows are the fees paid by exhibitors who want to present and sell their products to the particular attendees of that show. The expense of their exhibiting, obviously, is justified by the marketing exposure and sales they make at the particular shows they attend. This is the major driving force that makes trade shows profitable for sponsors and show managers. The trade shows sponsored by trade associations, technical groups, and other 'special interest groups' to promote their industry do play a roll in this trade show business. However, for the most part, anything that benefits the exhibitors, whether improved sales, more information on attendees/ sales prospects, more exposure of their products, etc., have a positive influence on the trade show business.

A regular, and continuing problem with trade shows have been the lack of ability of the exhibitors to identify the attendees, collect their names and data, and record the conversation that they had with the attendee during their few moments in the exhibitor's booth. This problem goes to the essence of a successful sale and if such problems could be economically and conveniently solved the trade show would be an even more economical sales and marketing vehicle. Over the past 50 years, sales lead collection systems have improved dramatically, however there does not exist today a universal dominant lead collection system for use at trade shows. Furthermore, all the known systems are clumsy to use, expensive, interfere with the salespeople performing their tasks, and do not enhance the selling process.

Known registration and lead collection systems typically include making the badges in advance or at the time of registration in the front lobby. Typically all these systems require the use of plastic badge holders. Many badges consist of a paper insert for name printing, and a plastic card for magnetic stripes or mechanically embossed data. All badges require some encoding means such as a magnetic stripe, one or two dimensional bar codes, or an electronic chip on the badge itself. All known lead collection systems require hardware in the exhibitor's booth. This is because the encoded data on each name badge must be recorded electronically by a computer device in the exhibitor's booth. If the computer device produces a paper printout of the data, then the salesperson has a means of recording detailed information about the sales prospect. If the computer device does not produce a paper printout, one can use a clumsy system of scanning in additional data. This does not permit you to add specific details, dates to call, etc. for sales reference, or even an image of the sales prospect. If the name card cannot be removed from the badge holder, then the attendee must be brought to the recording hardware, such as a hand held bar code scanner. If the name card can be removed from the badge holder, then the card must be scanned and returned to the proper individual. Frequently, when receiving multiple cards, you return the wrong name badge to the attendee. Furthermore, several percent of all issued electronic cards prove to be defective, causing an even greater annoyance. Such recording devices are slow, requiring as much as 10 to 30 seconds per card recording. This can cause a substantial delay in attending to additional sales leads and presents an annoyance to the attendee.

Additionally, an attendee may often give the salesperson their business card so as to provide additional fax, telephone, and other data for follow-up. Known lead retrieval system frequently do not provide such information and/or it may contain different (or possibly wrong) data provided by the attendee.

Prior art US Patents of interest are:

U.S. Pat. Nos. 5,873,606 and 5,715,215 to Haas et al describe an identification badge having abase coated with an adhesive protected by release paper. This badge is assembled by removing the release paper, placing an identification card into contact with the adhesive, and then attaching a fastener through a slot in the base of the badge. Various fasteners may be used to attach this badge to wearer's apparel. The badge can be assembled without damaging the identification card or the identification indicia, contained therein. The identification card can also be mounted so that the identification indicia is placed against a transparent, adhesive and viewed through a transparent base. In this embodiment, the information placed on the identification card cannot be altered without damaging the identification card. A timing indicator can be incorporated into the badge so as to show the expiration of the badge after a selected period of time. The identification badge can be easily assembled at the site of use, and it can be cut to fit whatever identification indicia that is to be applied to it, such as business cards, photo-identification cards or the like.

U.S. Pat. No. 5,768,633 to Allen et al. describes a photographic and data transmission system utilizing a wireless communication system, a camera used with the wireless system includes film or electronic sensor for capturing an image, a receiver for receiving a wireless signal from the wireless communication system, a decoder for decoding the wireless signal obtained by the receiver and magnetic layer on film or electronic storage device for storing the decoded wireless signal and the image. A trigger signal from the camera can be used to initiate transmission of the wireless signal from the wireless communication system. Moreover, the wireless signal may contain an internet address for accessing further information about an item being photographed. Such a camera is said to be of use in a trade show environment.

U.S. Pat. No. 5,635,012 to Belluci et al. describes an identification instrument such as a pocket-sized card that includes both human-recognizable and machine-readable indicia. The human-recognizable material may be any combination of photographs, graphical or textual information, with the machine-readable section encoding any or all of the human-recognizable areas in their entirety. When the card is presented for verification, the machine-readable section is scanned, decompressed and/or deciphered and compared to the database used to generate the human-recognizable section or sections. Only with a substantial matching of the information may the card and its user be authenticated. Preferably, a Symbol Technologies compliant two-dimensional barcode is used as the machine-readable encoding format. Multiple levels of encryption and decryption are also described in conjunction with enhanced security.

U.S. Pat. No. 5,634,016 to Steadham, Jr. et al. describes a computer integrated event management system that coordinates the entire process of event planning and implementation using specialized software combined with a microcomputer network which includes a network file server, CAD/DATA station and DATA stations where facility personnel are able to efficiently plan and implement events. The system includes a fully relational database and a CAD module which are connected together using a third module such that, whenever a piece of information is changes in one place, it is automatically changed everywhere it is stored in the database. The connecting module permits the database and the CAD module to communicate by translating information from a database format into a graphic format readable by CAD software packages as well as translating the graphic information back into the database information stored in the database.

U.S. Pat. No. 5,452,221 to Tumidei describes an automatic dispenser for visiting cards. The dispenser has a processor unit, a monitor and at least two printers managed by the processor unit. The dispenser further has a keyboard connected to the processor unit, a roll of cards and a rotary cutter for each printer arranged downstream of the printers and commanded by the processor. The processor unit sends to one of the printers codes necessary for printing each visiting card and, at the end of each printing operation a code is sent to activate the sound system of the printers. The sound system then activates the cutter after each individual visiting card has been completely printed.

U.S. Pat. No. 5,412,191 to Baitz et al. describes a service desk for the registration, booking and/or payment of goods, vouchers and the like. The desk has a service section that includes a data display device, a data input device and an output device for coupons, receipts and the like. This service section has a first part which is always on the customer's side of the service desk and a second part which can be moved between the customer's side and the operator's side of the service desk.

U.S. Pat. No. 5,235,519 to Miura describes a coin operated, computer controlled vending machine that prints and dispenses novelty business cards, change of address cards and the like. The vending machine includes a computer having a keyboard and video screen, a card dispenser, a printer and a coin acceptor which are interconnected with and controlled by the computer. When a user inserts a minimum preset amount of money into the coin acceptor, the card dispenser is activated whereby a preset number of blank cards are dispensed to the user. The computer is simultaneously activated and prompts the user to input the information to be printed onto the cards. The information to be printed on the cards is keyed into the computer and is visually displayed on the video screen. Various printed card formats are available.

U.S. Pat. Nos. 4,999,065 and 4,687,526 to Wilfert describe a high-security identification card is produced in a system in which a photograph from a video camera is converted to digital data and reproduced with high-fidelity on a video display screen. Other images, such as signatures and fingerprints, can be treated in a similar manner using either a video camera or a CCD (charge-coupled device). After processing, the video information is displayed on the screen where it is combined with variable data typed in from a keyboard. The digital data from the terminal is fed into a laser printer that prints the portrait and any desired alpha-numeric information on a paper sheet. The paper is then laminated, under heat and pressure, between two sheets of transparent thermoplastic material, at a temperature and pressure sufficient to cause the plastic material to penetrate the interstices between the fibers of the paper card and form a unitary structure that cannot be delaminated without destruction of the identifying data. The digital information is stored in a permanent memory to allow the card to be reproduced later, with or without modifications.

U.S. Pat. No. 4,921,278 to Shiang et al. describes a computer generated moire identification system. The system uses two kinds of computer generated grids, i.e., object grids and reference grids. An object grid is used as an information carrier. Specific information for identification, such as the owner's signature or photograph, is read into a computer, which codes the information into a grid, and then prints the code information onto an I/D plate or card. It is impossible to find out the hidden information by merely inspecting this plate. However, the coded information will reappear when the I/D plate is placed in a read-out machine, where the reference grid decodes the coded information in the form of Moire patterns.

U.S. Pat. No. 4,892,335 to Taft describes an identification card construction adapted for including several information-carrying mediums within the card construction. The card is adapted to avoid false indications of a card edge in apparatus which receives the card, e.g., to read magnetically-coded information on the card or to initially encode such information on the card.

U.S. Pat. No. 4,814,594 to Drexler describes a strip of optical contrast laser recording material disposed on a wallet-size card, and has laser written characters recorded thereon. The characters are formed by a plurality of pixels, similar in nature to the dots forming dot matrix characters, except that the pixels themselves are formed of spots. The spots are disposed in a geometric regular array and are usually written one column at a time until a complete pixel is formed. Machine readable and visually readable characters may be combined on a single data strip.

U.S. Pat. No. 4,509,277 to Bolton describes a convention badge having a combination of machine and visually readable cards, the machine-readable card being easily accessible for mechanically or electronically recording the information, and the visually readable cards containing information regarding the individual which is discernible at a substantial distance.

U.S. Pat. No. 4,330,350 to Andrews describes an identification card that includes a removable interleaf support to accommodate pre-encoding of an attached magnetic stripe element.

U.S. Pat. No. 4,233,661 to Bolton et al describes a system that includes a computer, for use in registering attendees at large gatherings, such as trade shows or conventions, and producing embossed identification and inquiry cards for each attendee. A plurality of data input terminals are used to supply information concerning each attendee to the programmed computer. Entered data is edited under software control before being stored by the computer. Appropriate portions of the entered data are transmitted to one of a plurality of card embossers where an identification and inquiry card is prepared. The entered data is retrieved from storage as desired to provide statistical information concerning attendance at the trade show or convention.

BRIEF DESCRIPTION OF THE DRAWINGS

Other important objects and features of the invention will be apparent from the following Detailed Description of the Invention taken in connection with the accompanying drawings in which:

FIGS. 5A–5B depicts additional examples of Lead Cards.

DESCRIPTION OF THE INVENTION

Figure 1:
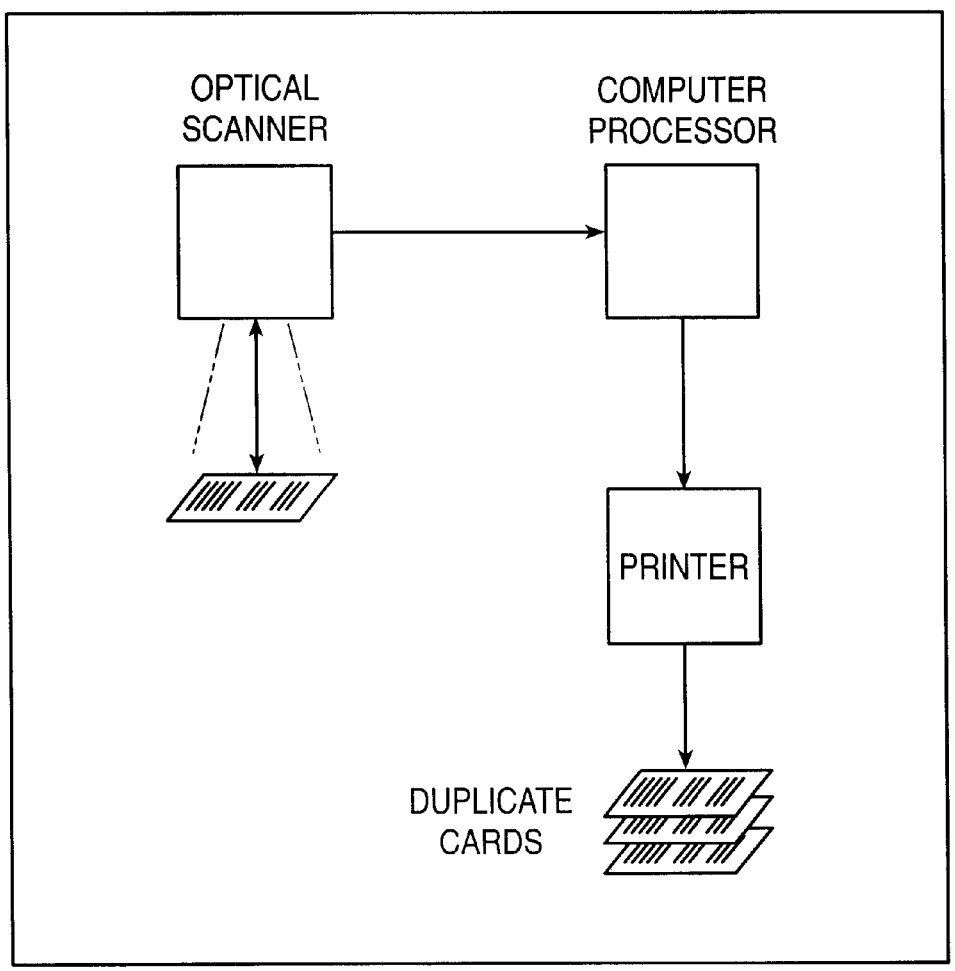
FIG. 1 is a schematic/flow chart of the functioning of the Lead Card Duplicating device.
Figure 2:
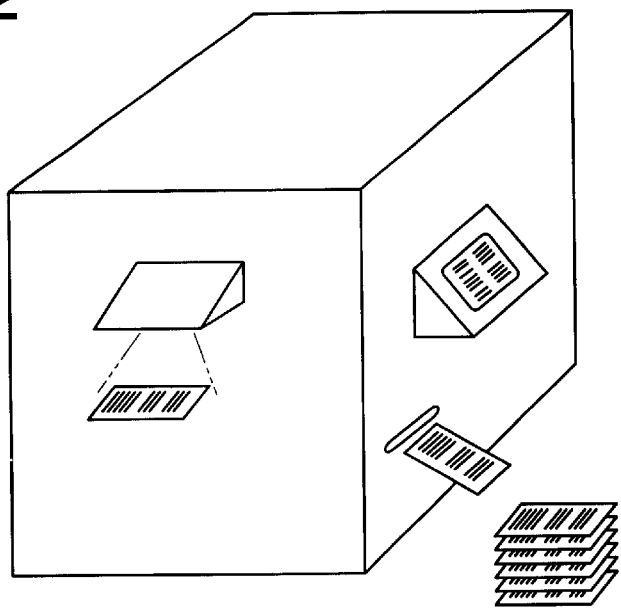
FIGS. 2 & 2A is a schematic/flow chart showing the Lead Card Duplicating device with a data input means to permit the attendee to place additional data on the Lead Card.
Figure 2A:
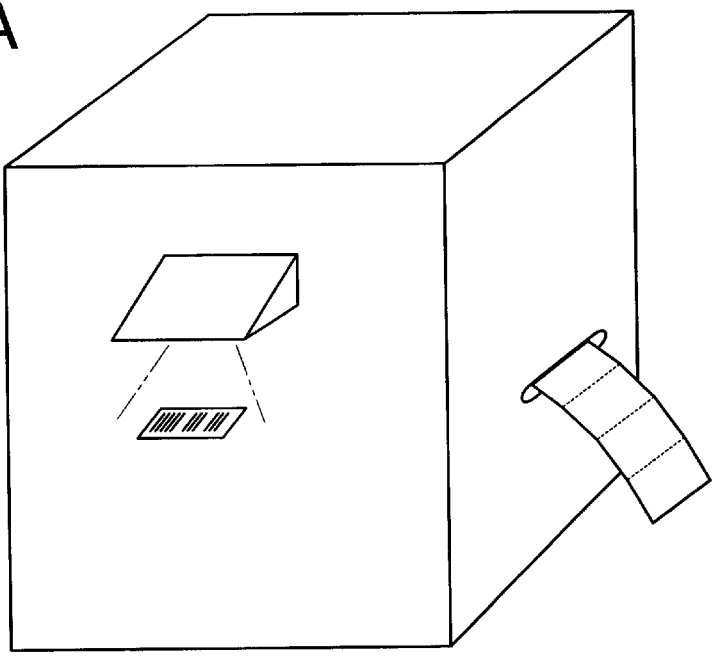
Figure 3:
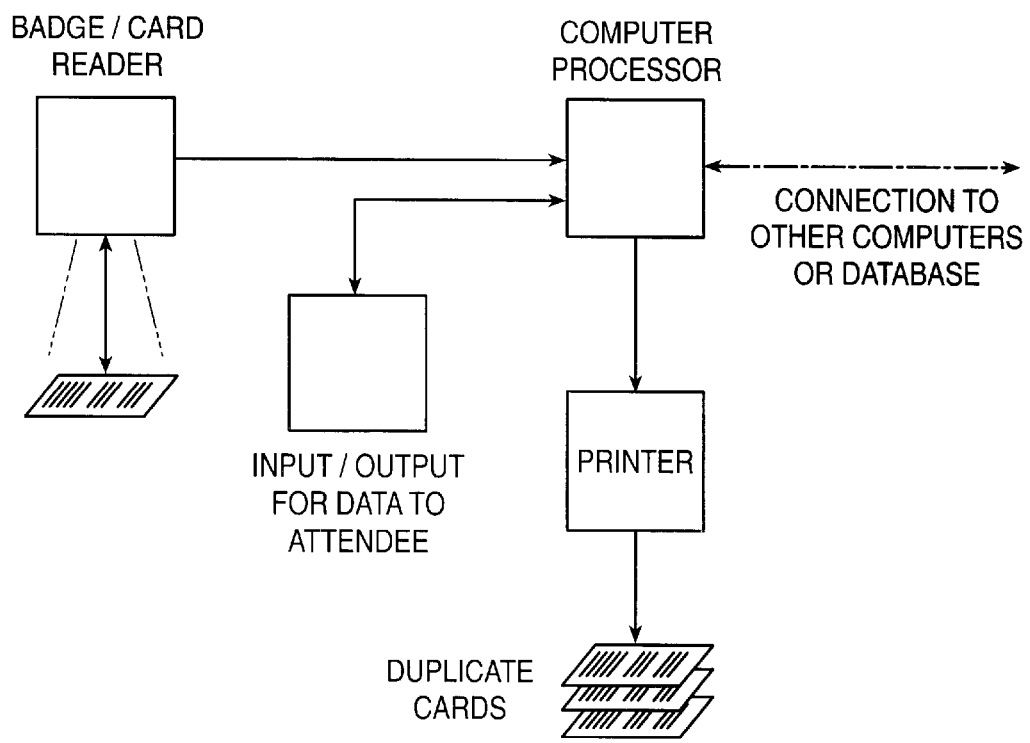
FIG. 3 is a schematic/flow chart showing the communication routes between the various computers.
Figure 4A:
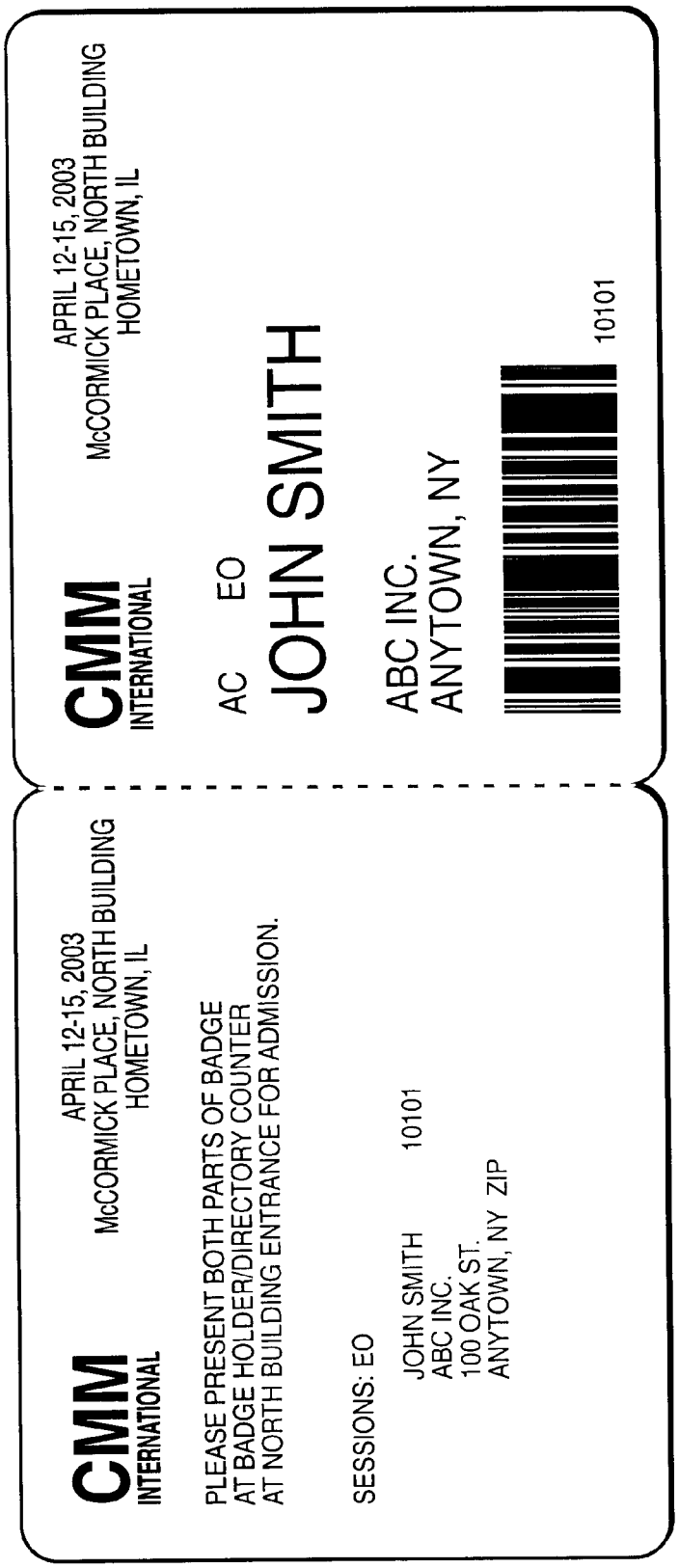
FIGS. 4A–4D depicts examples of electrically readable identification badges and Lead Cards.
Figure 4B:
Figure 4D:
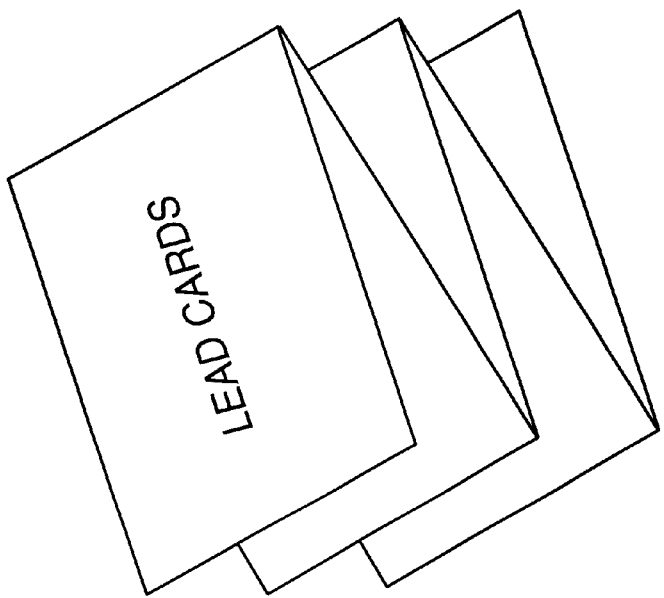
Figure 4C:
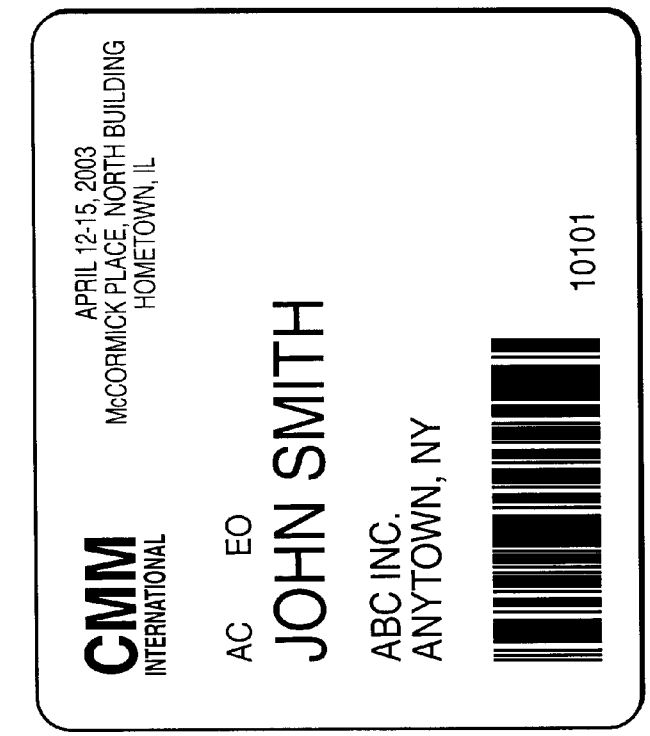
Figure 5A:
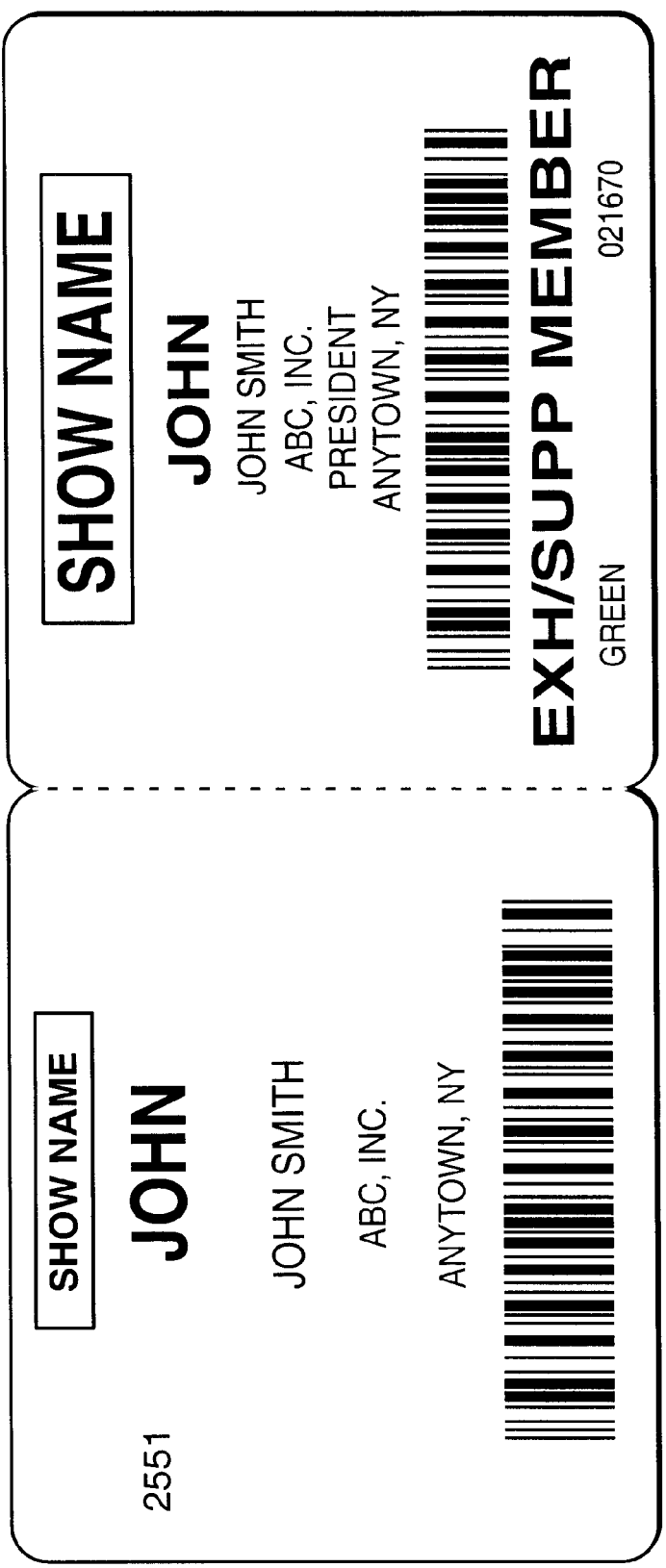

It is an object of this invention to provide a novel sales lead collection system (the "TB Card System") that overcomes most of the deficiencies of known trade show lead collection systems. The TB System has the potential of becoming universally accepted by the trade show industry because it is not dependent on any hardware. The exhibitors benefit by improved sales, and the trade show management benefits by the lower costs involved in such a system compared to the known systems.

The name card identification system of this invention is primarily used at conferences, meetings and trade shows. The system comprises a name card or badge containing visual information and a unique electronically readable code on each badge. Automatic duplicating (reproducing) equipment is placed at various locations within the halls, rooms, and exhibit centers at the show. These duplicating devices are capable of producing additional name cards for the individual that may be distributed to others ate the show, e.g., friends, vendors, other participants, at meetings at the show, etc. The duplicating devices are activated to produce the name cards upon reading the unique electronically readable code on the attendees badge. This code may be numerical, a printed bar code, e.g., one or two dimensional bar codes, electronically readable code on magnetic media or other electronic recording chips or devices. Preferably, the code can be read electronically and reproduce the information on the duplicated name card that is contained within the code.

The duplicating (reproducing) device is programed to automatically reproduce similar or identical name cards, when presented with the name identification card containing the electronically readable code. The duplicating device uses a non-impact (laser) printing on a continuous web of card stock so that a contiguous array of cards are produced.

The TB CARD System is a new "process" for performing trade show registrations and sales lead collection. There is no need for any hardware at the exhibitors booth to collect sales leads. The only requirement is the name badge duplicating device used in the exhibit hall and the associated software. Furthermore, contrary to current practices, the TB CARD System attendee registration system does not have to be operated by a professional registration company. It is simple enough that it can be operated by a relatively unsophisticated trade show sponsor, or by the trade show management company itself.

Ultimately, if the TB CARD System is successful, it will lead to the demise of the professional Registration Companies because sponsors and show management companies will take over show-registration as a new profit center.

Attendees send in their registration information by mail, telephone, fax, E-mail or directly on the internet. Utilizing this information, registration consists of:

1) adding the attendee data to the trade show database;
2) having the attendee pay the show admittance fee, fees for events, tickets for food, etc;
3) printing the attendees name badge and tickets for which they have paid. If a double-sided card badge is used, the paid ticket items can be printed on the back of the name badge. The name badge will have either a bar code, e.g., two-dimensional bar code or magnetic data on the card so that all the attendee's data is always on the name badge itself; and
4) printing multiple lead cards/name cards, e.g., 25, 50 which the attendee will give to each sales person that he or she wants literature or a sales call from. In other words, in addition to giving each attendee just a name badge, the attendee is also given a bunch of lead cards. The lead cards (probably 3"×4" cards) contain an electronically readable code (bar code, magnetic stripe, other) which the exhibitor can use to electronically read in the data when he gets back to the office.

In many trade shows today, the show management provides each exhibitor with a disk containing all the attendee data. Thus if the bar code on the lead card is only one-dimensional and, for example it only provides the attendee number, the exhibitor merely draws all the attendee's data off the disk. Most of these disks are universally supplied as Microsoft®Word® a documents. In past years it was impossible to provide such "universality" because each DOS database was different and it was very difficult for each exhibitor who attended many shows, to add the data to the exhibitors file.

Thus upon entrance to the show the attendee is provided with a name badge and a bunch of Lead Cards. As the attendee walks the show and gives his Lead Cards to the sales people in the booth, the salespeople can write on the card specific information on the attendee. If the attendee needs additional Lead Cards, the trade show management has installed 'Freestanding Duplicating Devices', i.e., an "FDD"—a self-contained laser or thermal printer with a name badge reader and possibly a keyboard—at several points on the show floor. The attendee place his name badge in the FDD and prints more Lead Cards. This provides an unlimited number of Lead Cards for each attendee, and the attendee does not have to run back to the lobby for more Lead Cards, i.e., to wait in line and get angry merely to have a few more Lead Cards printed. More importantly, most attendees are looking for specific products and have specific things they want to tell the salespeople when they speak with them in their booths. By means of the FDD, the attendee can print Lead Cards with additional specifications or data on it for the salespeople; they can also print a different address or person to send the literature to.

Very frequently, attendees who go to shows are asked by other people in their company to have additional cards to be printed with the other persons name and address on them to permit the salesperson to address the sale to the other person.

Thus, the lead retrieval system consists of a closed-loop paper & bar code arrangement that is human and electronically readable, easy to handle, available in unlimited numbers for attendees who want hundreds of Lead Cards. It also is superior to normal business cards and paper printouts because it permits the attendee (rather than the registration personnel) to customize it before passing it out, it permits alternate addresses and recipients on the Lead Cards, and it also permits people to bring their own Lead Cards from the office.

Lead Cards may be sent to each attendee before the show, for example as laser sheets, with or without their name bar coded on each card, so that they can prepare in advance their own Lead Cards. Basically, the Lead Cards can be a substitute for an attendee's business card. Most important, the show management provides for unlimited Lead Cards to be printed on the show floor, so that the attendee is serviced 100% by show management; this completely eliminates the exhibitor hardware (and hardware failure, eliminates the attendee's name card failure to read, eliminates the need for the attendee to spend time telling the salesperson his name, address, telephone number, etc).

In the system of this invention, i.e., the TB CARD System, software is required to print the name badges with two-dimensional bar codes and to print Lead Cards for each attendee and, optionally, even the envelope to mail the cards to the attendee in advance of the show. Software will be required for the FDD printers based on the show management requirements. Advertising can also be sold for placement on the Lead Cards or near/on the FDD device. This can provide a new source of revenue to show management.

There are several novel aspects of this invention, including but not limited to: individual, give-away Lead Cards for lead collection (transmission) at exhibitors booths, providing Freestanding Duplicating Devices (FDD) around the trade show floor for reproducing Lead Cards, and providing attendees with an unlimited supply of Lead Cards, and of producing more Lead Cards from either existing Lead Cards or the badge of the attendee. Modifications of the foregoing may be made without departing from the spirit and scope of the invention. What is desired to be protected by Letters Patents is set forth in the appended claims.

What is claimed is:

1. A name card identification system for a person attending a meeting at a location with other persons, comprising:

distributing a name card to the person prior to or upon entering the meeting location, the card comprising a substrate and visual information and electronically readable code on the substrate, the information and code uniquely associated with the person attending the meeting;

providing a printer at such meeting location for printing other name cards;

providing a reader at such meeting location for reading the code on the name card;

providing a means for transmitting such code from the reader to the printer;

reading the code on the name card by the reader;

transmitting the code to the printer;

printing at least one other name card for such person; and distributing such other name card to at least one other person attending such meeting.

2. The name card identification system of claim 1, wherein the code is numerical.

3. The name card identification system of claim 1, wherein the code is a printed barcode.

4. The name card identification system of claim 1, wherein the code is a one dimensional printed barcode.

5. The name card identification system of claim 1, wherein the code is a two dimensional printed barcode.

6. The name card identification system of claim 1, wherein the code is an electronically readable code on magnetic media.

7. The name card identification system of claim 1, wherein the printer is programed to automatically reproduce similar name cards.

8. The name card identification system of claim 1, wherein the printer is a non-impact printer capable of printing on a continuous web of cardstock so that a contiguous array of cards is produced.

* * * * *